No. 824,493. PATENTED JUNE 26, 1906.
D. McR. LIVINGSTON.
COOLER.
APPLICATION FILED NOV. 25, 1905.

WITNESSES:
Edward Thorpe

INVENTOR
D. McRa Livingston
BY
Munn
ATTORNEYS

UNITED STATES PATENT OFFICE.

D McRA LIVINGSTON, OF NEW YORK, N. Y.

COOLER.

No. 824,493.

Specification of Letters Patent.

Patented June 26, 1906.

Application filed November 25, 1905. Serial No. 289,052.

*To all whom it may concern:*

Be it known that I, D McRA LIVINGSTON, a citizen of the United States, and a resident of the city of New York, borough of Manhattan, in the county and State of New York, have invented a new and Improved Cooler or Similar Apparatus, of which the following is a full, clear, and exact description.

The invention is principally intended for embodiment in the coolers of motor-vehicles propelled by explosive-engines, and the present invention relates especially to that form of cooler in which the conduits are so bent as to present a diamond figure, the bends of the conduits being diagonal to the vertical and horizontal.

The invention consists in so flanging the side edges of the plates forming the conduits as to bring the joints of adjacent conduits into close relation at the extreme side edges whereby when the plates are dipped in solder to join the two plates of each pair forming a conduit the adjacent conduits will also be soldered together at the extreme edges.

Reference is to be had to the accompanying drawings, forming a part of this specification, in which similar characters of reference indicate corresponding parts in all the figures.

Figure 1:
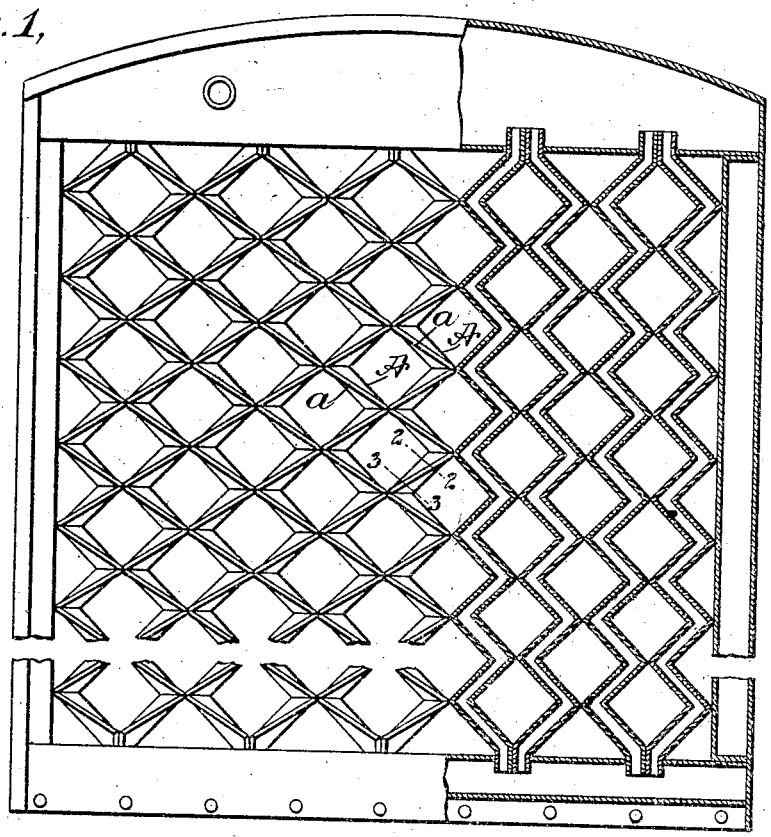
Figure 2:
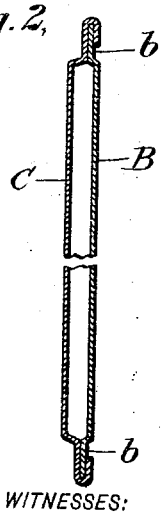
Figure 3:
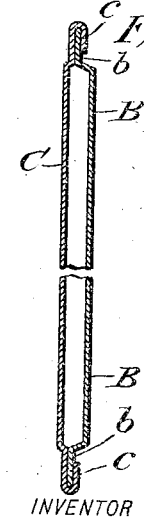

Figure 1 is an elevation, partly in section, of a cooler constructed in accordance with my invention. Fig. 2 is an enlarged cross-section on the line 2 2 of Fig. 1. Fig. 3 is an enlarged cross-section on the line 3 3 of Fig. 1, and Fig. 4 is an enlarged detail perspective view given to better illustrate the manner of flanging the side edges of the plates.

Ordinarily in the formation of coolers having the diamond design—that is, with the conduits running zigzag instead of having right-angular bends—the two plates of each conduit are equally offset to bring the joint to the median line of the conduit. In my invention, as is most clearly shown in Figs. 1 and 4, the plates are produced with a flange ranging diagonally to the median line of the conduit, the letter A in Fig. 1 indicating the conduit as a whole, and the letter *a* the flanged joint.

Figure 4:
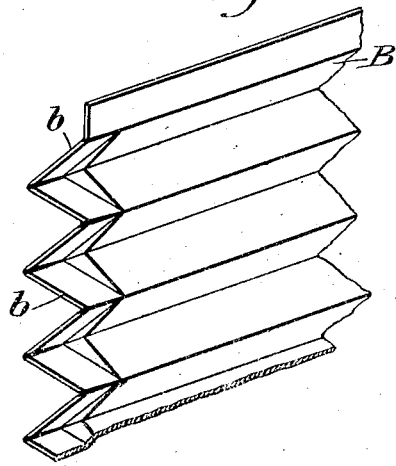

In Figs. 2, 3, and 4 the letter B indicates one plate, and *b* the flanged side edge ranging diagonally to the median line between the bends.

In Figs. 2 and 3 the letters B and *b* represent the similar parts in Fig. 4, while the letter C represents the companion plate, and *c* the hook portions on the latter, these hook portions of the plate C being return bent to engage the outwardly-projecting plain edges *b* of the companion plate.

The present invention, it should be understood, is not confined to the special manner of forming the plain edges and hook portions. Thus, as shown, the hook portions are formed on both side edges of one plate and the plain portions on both side edges of the companion plate; but this is immaterial as far as the present invention is concerned, since any relative arrangement of the hooks and plain portions may be adopted so long as the joint ranges diagonally to the median line between the bends, which, as will be seen most clearly in Fig. 1 at *a'*, brings the flanged joints of adjacent conduits into close contact at the extreme side edges, because each two adjacent members (*a*, Fig. 1, *b*, Fig. 2) converge at the outer angle of each bend of a conduit, whereas in previous coolers, or in like apparatus in which the conduits are zigzag, the joint has a median line paralleling the sides of the conduit, which, as will be obvious, leaves the conduits at the side edges separated, the conduits contacting only at points some distance from the side edges, thereby necessitating the dipping of the cooler to a considerable depth to solder adjacent conduits to each other.

Having thus described my invention, I claim as new and desire to secure by Letters Patent—

1. A cooler or like apparatus having conduits formed with bends to produce circuitous passages, each conduit being composed of a pair of plates joined at the side edges on lines diagonal to the median line of the conduit.

2. A cooler or like apparatus formed of conduits arranged to present a diamond pattern, each conduit being formed of corrugated plates, the plates forming a conduit being connected with each other at the side edges on lines that are disposed in each bend of the conduit diagonal to the median line of the conduit, the joints of adjacent conduits contacting with each other at the angles.

In testimony whereof I have signed my name to this specification in the presence of two subscribing witnesses.

D McRA LIVINGSTON.

Witnesses:
 EVERARD B. MARSHALL,
 J. L. McAULIFFE.